United States Patent
Dunko

(10) Patent No.: US 7,747,226 B2
(45) Date of Patent: Jun. 29, 2010

(54) PORTABLE ELECTRONIC DEVICES INCLUDING MULTI-MODE MATCHING CIRCUITS AND METHODS OF OPERATING THE SAME

(75) Inventor: Greg A. Dunko, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1373 days.

(21) Appl. No.: 10/823,069

(22) Filed: Apr. 13, 2004

(65) Prior Publication Data

US 2005/0227633 A1 Oct. 13, 2005

(51) Int. Cl.
*H04B 1/38* (2006.01)

(52) U.S. Cl. .................... 455/90.3; 455/80; 455/83; 455/193.1

(58) Field of Classification Search ............. 455/80, 455/87, 90, 107, 248.1, 558
See application file for complete search history.

(56) References Cited

U.S. PATENT DOCUMENTS

| | | | |
|---|---|---|---|
| 5,335,368 A * | 8/1994 | Tamura | 455/575.7 |
| 5,564,086 A | 10/1996 | Cygan et al. | |
| 5,778,308 A | 7/1998 | Sroka et al. | |
| 5,867,127 A | 2/1999 | Black et al. | |
| 5,923,297 A | 7/1999 | Kim et al. | |
| 6,266,538 B1 | 7/2001 | Waldron | |
| 6,327,485 B1 | 12/2001 | Waldron | |
| 6,570,462 B2 | 5/2003 | Edmonson et al. | |
| 6,862,432 B1 * | 3/2005 | Kim | 455/80 |
| 7,020,504 B2 * | 3/2006 | Lim | 455/575.3 |
| 2001/0046880 A1 | 11/2001 | Hosonuma | |
| 2003/0144031 A1 | 7/2003 | Ono et al. | |
| 2004/0008151 A1 | 1/2004 | Kurihara | |
| 2004/0110541 A1 * | 6/2004 | Choo | 455/566 |
| 2004/0185920 A1 * | 9/2004 | Choi et al. | 455/575.1 |

FOREIGN PATENT DOCUMENTS

| | | |
|---|---|---|
| CN | 1411253 A | 4/2003 |
| EP | 0 518 526 | 12/1992 |
| EP | 1 258 943 | 11/2002 |
| KR | 20010011282 A | 2/2001 |
| WO | WO 96/37967 | 11/1996 |
| WO | WO99/27610 | 6/1999 |
| WO | WO 03/103157 | 12/2003 |

OTHER PUBLICATIONS

International Search Report corresponding to PCT/US2004/037453, dated Feb. 23, 2005.
First Office Action, Chinese Patent Application No. 200480042687.X, Mar. 13, 2009.
Examination Report, European Patent Application No. 04 810 652.0; Jul. 2, 2009.

* cited by examiner

*Primary Examiner*—Duc Nguyen
*Assistant Examiner*—Zhiyu Lu
(74) *Attorney, Agent, or Firm*—Myers Bigel Sibley & Sajovec

(57) ABSTRACT

Portable electronic devices are provided including a housing, an antenna associated with the housing and a multi-mode matching circuit operatively associated with the antenna. The multi-mode matching circuit is configured to operate in a first mode when the housing of the portable electronic device is in a first configuration and in a second mode when the housing of the portable electronic device is in a second configuration. Related methods of operating portable electronic devices including multi-mode matching circuits are also discussed.

2 Claims, 4 Drawing Sheets

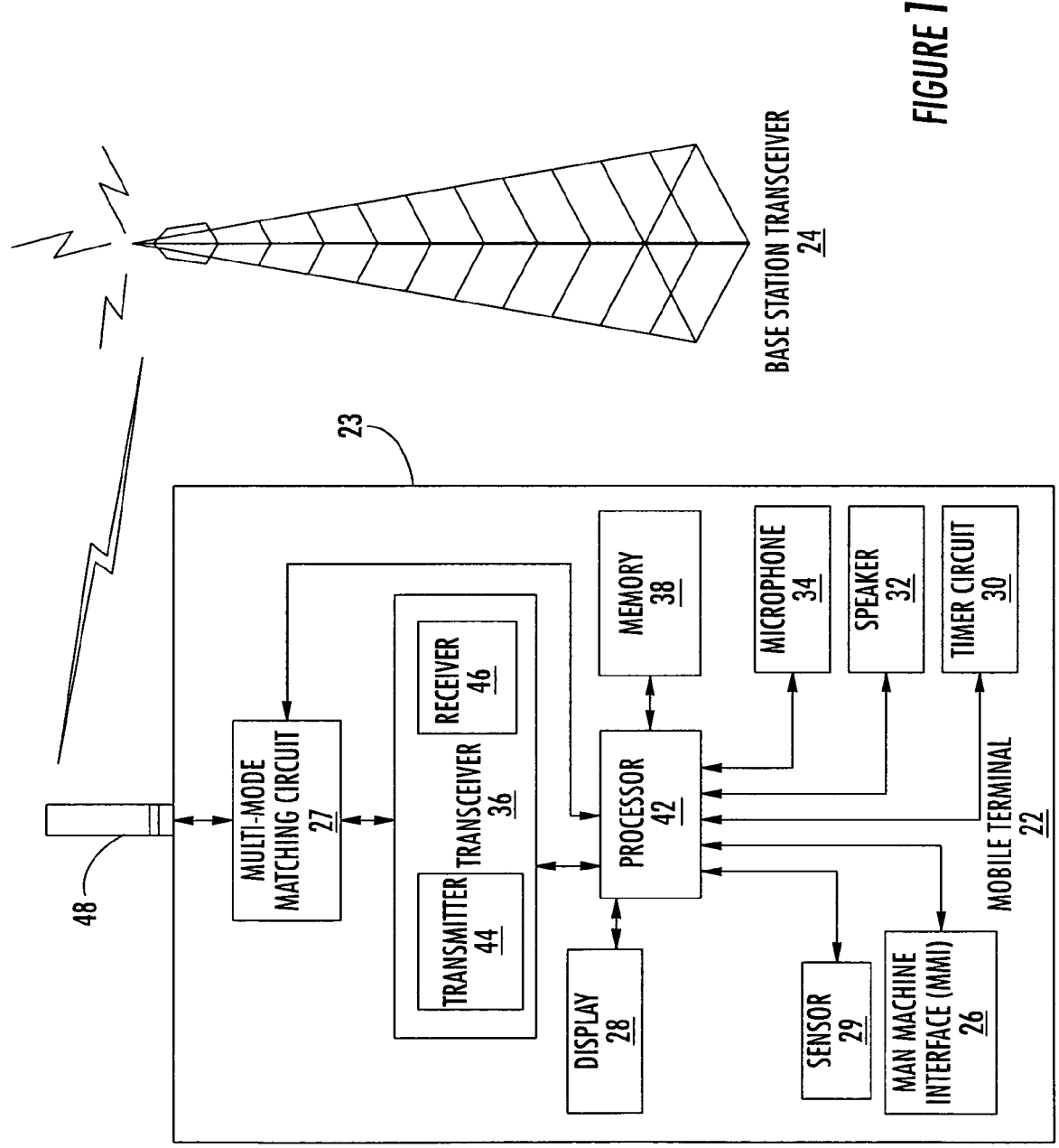

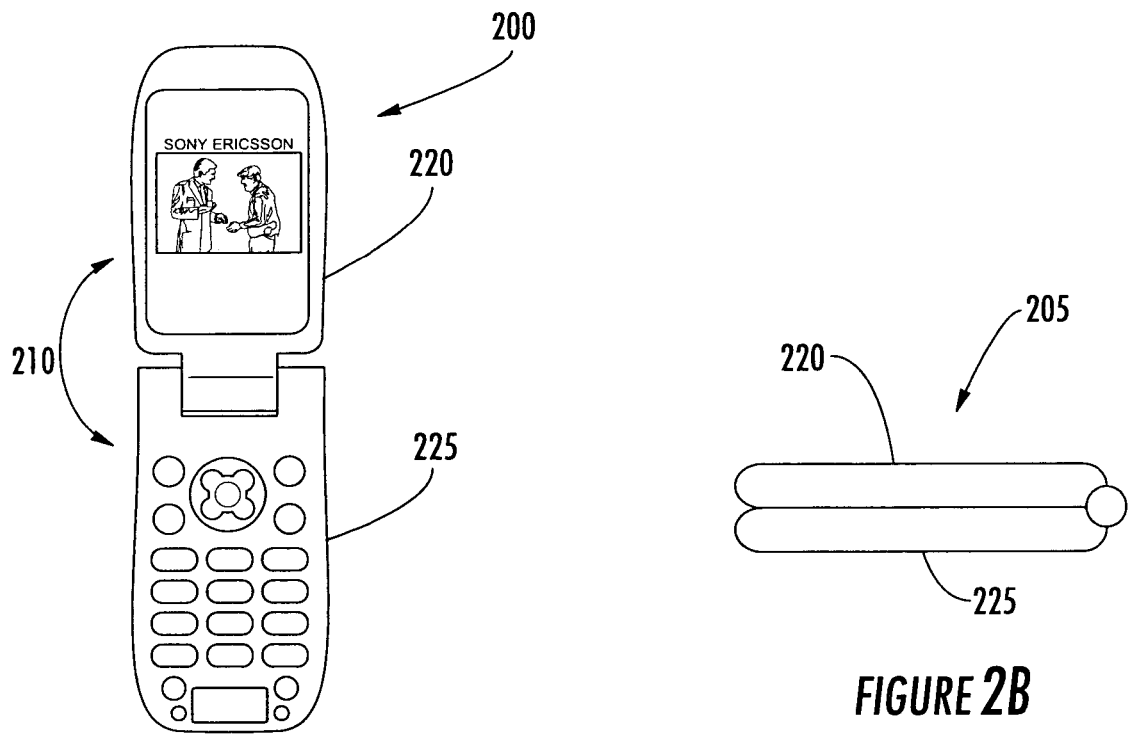
FIGURE 2A
FIGURE 2B
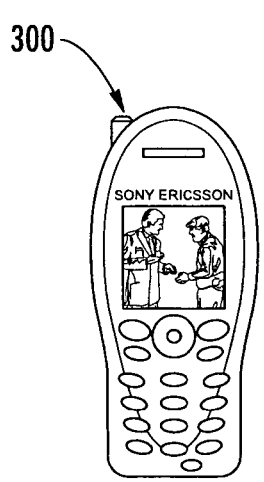
FIGURE 3A
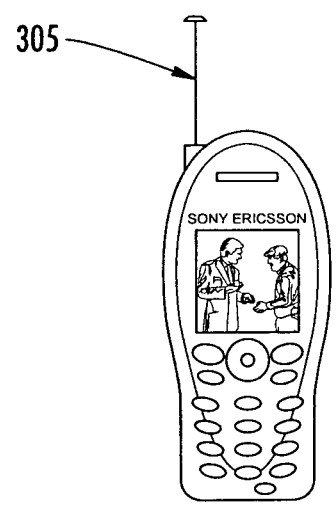
FIGURE 3B

| ANGLE | RESISTANCE | CAPACITANCE | INDUCTANCE |
|---|---|---|---|
| 0 (CLOSED) | V1 | C1 | L1 |
| 45 | V2 | C2 | L2 |
| 90 | V3 | C3 | L3 |
| 135 | V4 | C4 | L4 |
| 180 (OPEN) | V5 | C5 | L5 |

PORTABLE ELECTRONIC DEVICES INCLUDING MULTI-MODE MATCHING CIRCUITS AND METHODS OF OPERATING THE SAME

FIELD OF THE INVENTION

The present invention relates to portable electronic devices and, more particularly, to adaptive antennas of portable electronic devices and methods of operating the same.

BACKGROUND OF THE INVENTION

Recently, there has been a proliferation in the field of wireless communications. Devices such as cordless and cellular telephones, pagers, wireless modems, wireless email devices, personal digital assistants (PDAs) with communication functions, and other portable electronic devices are becoming commonplace. To preserve the integrity of transmission to and from such devices, it is important to maintain a clear, strong radio signal.

A gain of an antenna of a portable electronic device, such as a pager or a cellular telephone be may be lowered by the presence of certain objects such as metallic objects and/or by ground plane conditions, i.e. the antenna may be detuned. When the antenna is detuned, the portable electronic device may have a shorter operating radius and may experience poor in-building performance or fringe performance, i.e. performance at the edge of a cell.

Embedded antennas are common in conventional portable electronic devices. A signal transmitted from or received by an antenna which is integrated into a portable electronic device may encounter several boundaries, including for example a printed circuit board, a battery, a display screen, a device housing, a device carrying case and any of a multitude of other elements or components associated with the device, in addition to a user's body. All such boundaries may influence the propagation of the signal and the surrounding impedance seen by the antenna.

Furthermore, when a portable electronic device is in operation, it may be turned in different directions and may not be optimally aligned to receive and/or transmit signals. At least a portion of signal power losses associated with antennas in portable electronic devices is due to signal reflection. Ideally, all of the signal power of a signal input to an antenna would be converted into an electromagnetic signal and radiated. Likewise, ideally all electromagnetic energy received at the antenna would be converted into an electrical signal and provided to receive electronics. However, in reality the characteristic impedance of the portable electronic device interacts with the characteristic impedance of the antenna and unless these impedances are equal, some signal reflection will likely occur.

Accordingly, some conventional portable electronic devices may include an impedance matching circuit between communication circuitry of the portable electronic device and an antenna. Impedance matching circuits typically include an LC circuit with inductance and capacitance elements connected in any one of a number of standard matching circuit topologies. However, some conventional impedance matching circuits may be configured during manufacture of the portable electronic device and may not provide for adjustments in the field. Thus, the matching circuit may not adapt to environmental conditions that may influence the impedance affecting the antenna. For example, over the air signals transmitted and received by an antenna of a portable electronic device may encounter such dielectric boundaries as the housing of device, printed circuit boards, electronic components in the housing, batteries for powering the device, display, input device and the body of a device user, all of which may influence the impedance seen by the antenna. Such impedances can be estimated, but are dependent upon the orientation of the device with respect to its surroundings. Thus, even the best estimates of impedance matching requirements may not remain accurate for all device operating conditions.

To address possible problems with matching circuits discussed above, adaptive antenna assemblies have been provided in some conventional portable electronic devices such that the antenna may adapt to environmental conditions. For example, adaptive antennas are discussed in U.S. Pat. No. 6,570,462 to Edmonson et al., U.S. Pat. No. 5,778,308 to Sroka et al. and U.S. Pat. No. 5,564,086 to Cygan et al. However, improved antenna matching circuits may be desirable.

SUMMARY OF THE INVENTION

Embodiments of the present invention provide portable electronic devices including a housing and an antenna associated with the housing. The portable electronic device also includes a multi-mode matching circuit operatively associated with the antenna. The multi-mode matching circuit is configured to operate in a first mode when the housing of the portable electronic device is in a first configuration and in a second mode when the housing of the portable electronic device is in a second configuration.

In some embodiments of the present invention, the portable electronic device may further include a sensor operatively associated with the multi-mode matching circuit. The sensor may be configured to detect the first configuration of the housing of the portable electronic device and/or the second configuration of the housing of the portable electronic device. The multi-mode matching circuit may be configured to adjust at least one parameter of the multi-mode matching circuit responsive to the first and/or second detected configurations of the housing of the portable electronic device.

In further embodiments of the present invention, the multi-mode matching circuit may include an impendence matching circuit. The at least one parameter of the multi-mode matching circuit may include a resistance, a capacitance and/or an inductance and may be stored in a lookup table.

In still further embodiments of the present invention, the portable electronic device may further include a processor operatively associated with the sensor. The processor may be configured to locate the at least one parameter in the lookup table using the first and/or second detected configuration of the housing of the portable electronic device as a pointer for an entry in the lookup table.

In some embodiments of the present invention, the portable electronic device may further include a timer circuit operatively associated with the sensor. The sensor may be further configured to detect the first and/or second configuration of the housing of the portable electronic device responsive to expiration of the timer circuit. The timer, for example, may be configured to trigger periodic detection of the housing configuration.

In further embodiments of the present invention, the portable electronic device may be a portable electronic device having a flip configuration. The portable electronic device may be in the first configuration when the portable electronic device is open and the portable electronic device may be in the second configuration when the portable electronic device is closed.

While the present invention is described above primarily with reference to portable electronic devices, methods of operating portable electronic devices are also provided.

BRIEF DESCRIPTION OF THE DRAWINGS

FIG. 1 is a schematic diagram of mobile terminals according to some embodiments of the present invention and an exemplary base station transceiver.

FIGS. 2A and 2B are diagrams illustrating configurations of portable electronic devices according to some embodiments of the present invention.

FIGS. 3A and 3B are diagrams illustrating configurations of portable electronic devices according to further embodiments of the present invention.

DETAILED DESCRIPTION

Figures 4, 5:
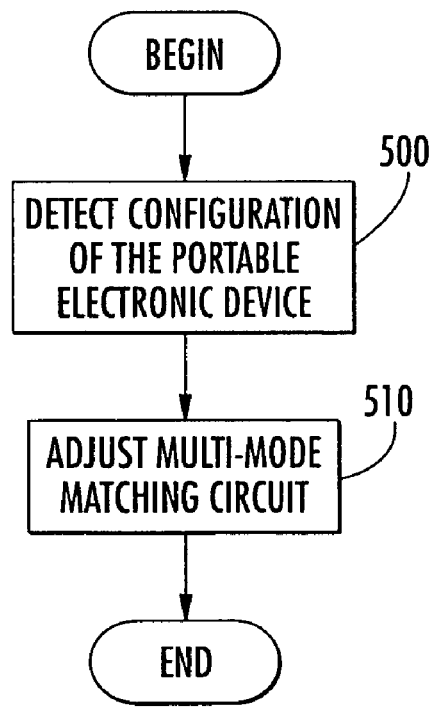
FIG. 4 is an exemplary lookup table according to some embodiments of the present invention.
FIG. 5 is a flowchart illustrating operations of portable electronic devices according to some embodiments of the present invention

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

Embodiments of the present invention will now be described below with respect to FIGS. 1 through 6. Embodiments of the present invention provide portable electronic devices including multi-mode matching circuits. The multi-mode matching circuit may operate in a first mode when the housing of the portable electronic device and/or the antenna is in a first configuration and a second mode when the housing of the portable electronic device and/or the antenna is in a second configuration. In particular, a sensor may be provided that is configured to detect the configuration of the housing of the portable electronic device and/or the antenna and adjust the mode of the multi-mode matching circuit responsive to the detected configuration of the housing of the portable electronic device and/or the antenna. Accordingly, an impedance of multi-mode matching circuits according to embodiments of the present invention may be adjusted based on the configuration of the housing of the portable electronic device and/or the antenna and, therefore, portable electronic devices may be provided having improved transmission characteristics, i.e., more radiation and less reflection of the signal. Receive characteristics of the portable electronic device may also be improved.

The present invention is described below with reference to schematic and block diagrams of mobile terminals including multi-mode matching circuits according to some embodiments of the present invention. Although multi-mode matching circuits are discussed herein as being included as part of a mobile terminal, for example, mobile terminal 22 of FIG. 1, embodiments of the present invention are not limited to this configuration. Multi-mode matching circuits according to embodiments of the present invention may be included in any portable electronic device that utilizes an antenna suitable for operation with one or more matching circuits without departing from the scope of the present invention.

FIG. 1 illustrates an exemplary radiotelephone communication system, in accordance with embodiments of the present invention, which includes the mobile terminal 22 and a base station transceiver 24 of a wireless communications network. The mobile terminal 22 includes a portable housing 23 and may include a man machine interface 26, a display 28, a timer circuit 30, a speaker 32, a microphone 34, a transceiver 36, and a memory 38, any of which may communicate with a processor 42. Furthermore, mobile terminals 22 according to embodiments of the present invention may further include a multi-mode matching circuit 27 according to embodiments of the present invention and a sensor 29 operatively associated with the multi-mode matching circuit 27, which also communicate with a controller/processor 42. The processor 42 can be any commercially available or custom microprocessor.

The transceiver 36 typically includes a transmitter circuit 44 and a receiver circuit 46, which respectively transmit outgoing radio frequency signals to the base station transceiver 24 and receive incoming radio frequency signals, such as voice signals, from the base station transceiver 24 via an antenna 48. The antenna 48 may be an embedded antenna, a retractable antenna or any antenna known to those having skill in the art without departing from the scope of the present invention. The radio frequency signals transmitted between the mobile terminal 22 and the base station transceiver 24 may comprise both traffic and control signals (e.g., paging signals/messages for incoming calls), which are used to establish and maintain communication with another party or destination. The processor 42 may support various functions of the mobile terminal 22, including processing detected configurations of the housing of the mobile terminal 22 and/or the antenna 48.

As used herein, the term "portable electronic device" or "mobile terminal" may include: a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; a gaming device, an audio video player, and a conventional laptop and/or palmtop portable computer that may include a radiotelephone transceiver.

In some embodiments of the present invention, the base station transceiver 24 comprises the radio transceiver(s) that defines an individual cell in a cellular network and communicates with the mobile terminal 22 and other mobile terminals in the cell using a radio-link protocol. Although only a single base station transceiver 24 is shown, it will be understood that many base station transceivers may be connected through, for example, a mobile switching center and other devices to define a wireless communications network.

Although the present invention may be embodied in communication devices or systems, such as the mobile terminal 22, the present invention is not limited to such devices and/or systems. Instead, the present invention may be embodied in any apparatus that may utilize a multi-mode matching circuit according to embodiments of the present invention.

In some embodiments of the present invention, the multi-mode matching circuit 27 is operatively associated with the antenna 48. The multi-mode matching circuit 27 may be configured to operate in a first mode when the housing of the portable electronic device is in a first configuration and in a second mode when the housing of the portable electronic device is in a second configuration. In certain embodiments of the present invention, the portable electronic device may be a mobile terminal having a flip configuration as illustrated in FIGS. 2A and 2B. The housing of mobile terminal may be in the first configuration 200 may be when the mobile terminal is open as illustrated in FIG. 2A. Similarly, the housing of the mobile terminal may be in the second configuration 205 when the mobile terminal is closed as illustrated in FIG. 2B.

As discussed above, a sensor 29 may be operatively associated with the multi-mode matching circuit. The sensor 29 may be configured to detect the configuration of the housing of the portable electronic device. The multi-mode matching circuit 27 may be, for example, an impedance matching circuit and may be configured to adjust one or more parameters or tuning coefficients, for example, a resistance, capacitance and/or an inductance, of the multi-mode matching circuit responsive to the detected configuration of the housing of the mobile terminal 22. The sensor 29 may be a mechanical sensor, an electrical sensor, an acoustic sensor or a combination of any of these without departing from the scope of the present invention. Operations of sensors are known to those having skill in the art and will not be discussed further herein.

It will be understood that although multi-mode matching circuits according to embodiments of the present invention are discussed herein as having first and second modes of operation, multi-mode matching circuits according to embodiments of the present invention are not limited to this configuration. Multi-mode matching circuits according to embodiments of the present invention may have three or more modes without departing from the scope of the present invention. For example, in embodiments of the present invention wherein the mobile terminal has a flip configuration, the mobile terminal may not just be open 200 or closed 205 (FIGS. 2A and 2B), the mobile terminal may be a quarter open, half open, three quarters open and the like. Thus, each of the configurations of the mobile terminal may have a corresponding mode of the multi-mode matching circuit 27.

In some embodiments of the present invention, the parameters of the multi-mode matching circuit may be stored in a lookup table, for example, the lookup table 400 illustrated in FIG. 4. The lookup table may be created during calibration of the mobile terminal during manufacturing. The calibration process may be performed on each mobile terminal individually or may be performed on two or more mobile terminals simultaneously without departing from the scope of the present invention. The processor 42, operatively associated with the sensor 29, may be configured to locate the parameters of the multi-mode matching circuit 27 in the lookup table 400 using, for example, the detected configuration of the housing of the mobile terminal as a pointer for an entry in the lookup table.

It will be understood that the lookup table may be predefined and loaded onto a mobile terminal or a plurality of mobile terminals without departing from the scope of the present invention. In other words, the lookup table may not be created during calibration of the mobile terminal during manufacturing, it may be preexisting and simply loaded onto the mobile terminal during manufacturing.

For example, if the mobile terminal is closed, i.e., the angle 210 between a first portion 220 of the mobile terminal and a second portion 225 of the mobile terminal is 0 degrees, the parameters for the matching circuit 27 may be R1, C1 and/or L1. Similarly, if the angle 210 between a first portion 220 of the mobile terminal and a second portion 225 of the mobile terminal is 45 degrees, the parameters for the multi-mode matching circuit 27 may be R2, C2 and/or L2. The parameters for multi-mode matching circuit when the angle 210 is 90, 135 and 180 degrees are set out in the lookup table 400 of FIG. 4.

It will be understood that the angles provided in the lookup table 400 are provided for exemplary purposes only and embodiments of the present invention should not be limited to these angles. It will be further understood that the angles that change are not limited to the angles provided in, for example, FIG. 2A, any possible angle change between first and second portions of the mobile terminal may be used without departing from the scope of the present invention. Furthermore, details with respect to the parameters (tuning coefficients) of the multi-mode matching circuit 27 and operations thereof are known to those having skill in the art and will not be discussed further herein.

In some embodiments of the present invention, a timer circuit 30 may be operatively associated with the sensor 29. The sensor 29 may be further configured to repeatedly detect the configuration of the mobile terminal responsive to expiration of the timer circuit 30. It will be understood that although embodiments of the present invention may be discussed herein with respect to mobile terminals having a flip configuration and/or retractable antennas, embodiments of the present invention are not limited to these configurations. Multi-mode matching circuits according to embodiments of the present invention may be used in any portable electronic device having multiple configurations. For example, mobile terminals having a jack-knife configuration or a camera configured to protrude from the mobile terminal during camera functionality and to retract when not in use are within the scope of the present invention.

It will be further understood that although embodiments of the present invention are discussed herein with respect to configurations of the housing of the portable electronic device, embodiments of the present invention are not limited to this configuration. For example, in some embodiments of the present invention the multi-mode matching circuit 27 may switch between first and second modes responsive to a position of the antenna relative to the housing of the mobile terminal. For example, the multi-mode matching circuit 27 may operate in a first mode when a retractable antenna is in a first retracted position 300 relative to the housing of the mobile terminal as illustrated in FIG. 3A. Similarly, the multi-mode matching circuit may operate in a second mode when the retractable antenna is in a second extended position 305 relative to the housing of the mobile terminal as illustrated in FIG. 3B.

Over the air signals transmitted and received by an antenna 48 of a portable electronic device may encounter such electromagnetic boundaries as the housing of device, printed circuit boards, electronic components in the housing, batteries for powering the device, display, input device and the body of a device user, all of which may influence the impedance seen by the antenna. Portable electronic devices including multi-mode matching circuits 27 according to embodiments of the present invention may provide the ability to change the impedance of the multi-mode matching circuit based on the configuration of the housing and/or the antenna so that a strong signal may be transmitted and/or received regardless of the orientation of the portable electronic device with respect to its surroundings. Accordingly, portable electronic devices including multi-mode matching circuits according to embodiments of the present invention may have relatively higher gains and higher proportions of signal radiation. Thus, embodiments of the present invention may provide portable electronic devices having improved radio performance characteristics.

Referring now to FIG. 5, operations of portable electronic devices including multi-mode matching circuits according to some embodiments of the present invention will be discussed. Operations begin at block 500 by detecting a configuration of a housing of the portable electronic device. Detection of the configuration may be performed when the portable electronic device is powered on and may be periodically detected when a change of configuration is detected or a timer circuit expires. In embodiments of the present invention where the housing of the portable electronic device includes a mobile terminal having a flip configuration, the configuration of the mobile terminal may be open, closed and/or partially open/closed. The configuration of the housing of the portable electronic device may be detected by a sensor operatively associated with a multi-mode matching circuit. One or more parameters of the multi-mode matching circuit may be adjusted based on the detected configuration of the housing of the portable electronic device (block 510).

Referring now to the flowchart of FIG. 6, operations of portable electronic devices including multi-mode matching circuits according to further embodiments of the present invention will be discussed. Operations begin at block 600 by detecting a configuration of a housing of the portable electronic device. The configuration of the mobile terminal may be detected by a sensor operatively associated with a multi-mode matching circuit of the portable electronic device. One or more parameters of the multi-mode matching circuit may be located in a lookup table (block 610). The lookup table may be created during calibration of the portable electronic device during manufacturing. The calibration process may be performed on each portable electronic device individually or may be performed on two or more portable electronic devices simultaneously without departing from the scope of the present invention. The detected configuration of the housing of the portable electronic device may be used as a pointer for an entry in the lookup table. In some embodiments of the present invention, the sensor may be operatively associated with a processor, which may be configured to locate the one or more parameters in the lookup table.

The one or more parameters located in the lookup table may be used to adjust the multi-mode matching circuit to adapt the impedance of the antenna to environmental conditions (block 620). It is determined if the configuration of the phone has changed or a timer has expired (block 630). If it is determined that the configuration has changed and/or a timer has expired (block 630), operations return to block 600 and repeat. If it is determined that the configuration has not changed and/or the timer has not expired (block 630), operations remain at block 630 until the configuration of the mobile terminal changes and/or the timer expires.

Figure 6:
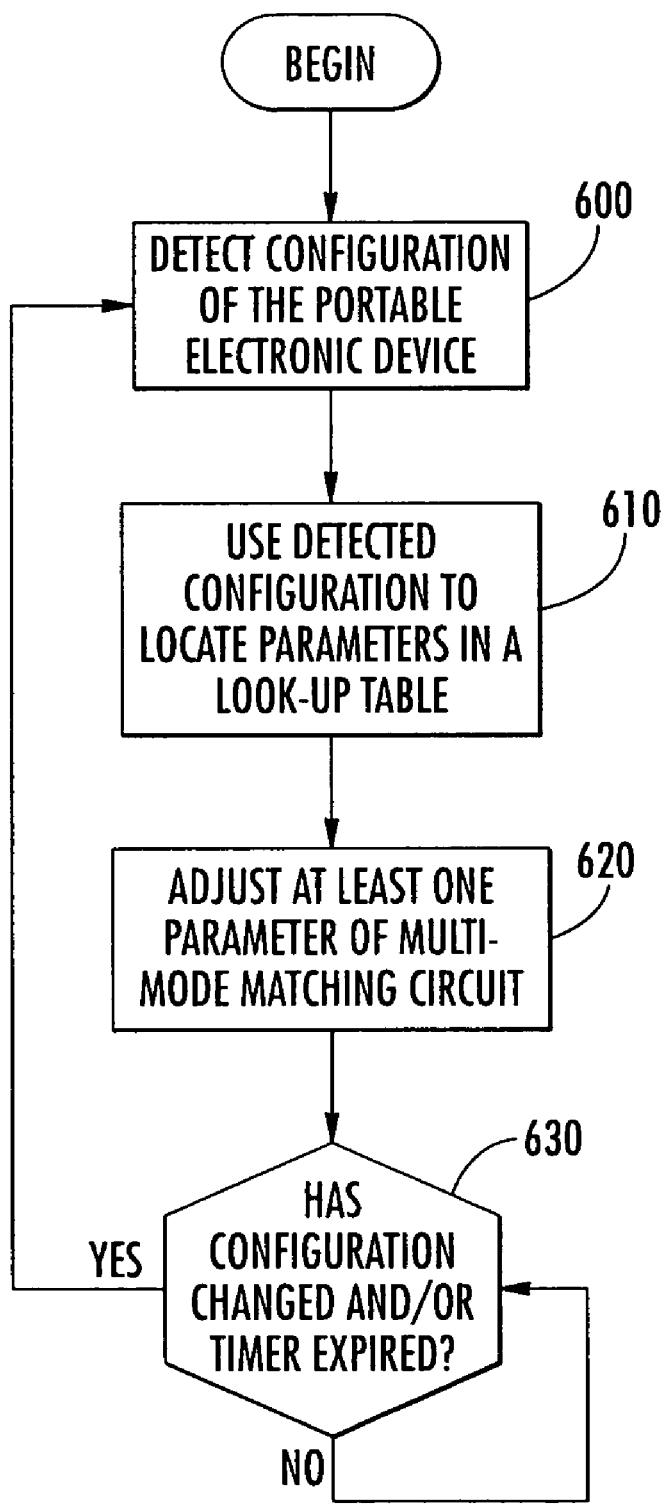
FIG. 6 is a flowchart illustrating operations of portable electronic devices according to further embodiments of the present invention.

It will be understood that although the methods discussed with respect to the flowcharts of FIGS. 5 and 6 are discussed with respect to detection of a configuration of the housing of a portable electronic device at block 500 and 600, respectively, embodiments of the present invention are not limited to this configuration. In some embodiments of the present invention operations of block 500 and/or 600 may include detecting a position of an antenna relative to the housing of the portable electronic device as discussed above without departing from the scope of the present invention.

As briefly discussed above with respect to FIGS. 1 through 6, embodiments of the present invention provide portable electronic devices having multi-mode matching circuits. One or more parameters of the multi-mode matching circuit may be adjusted based on a detected configuration of the housing of the portable electronic device and/or position of the antenna relative to the housing of the portable electronic device. Adjusting the parameters of the matching circuit may provide the ability to change the impedance of the multi-mode matching circuit based on the configuration of the housing and/or the antenna so that a strong signal may be transmitted and/or received regardless of the orientation or configuration of the portable electronic device with respect to its surroundings. Accordingly, portable electronic devices including multi-mode matching circuits according to embodiments of the present invention may experience higher gains and/or less reflection due to the adaptability of the antenna.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A portable electronic device, comprising:
   a housing;
   an antenna associated with the housing;
   a multi-mode matching circuit operatively associated with the antenna, the multi-mode matching circuit being configured to operate in at least three modes corresponding to respective first through third configurations of the housing; and
   a camera configured to protrude from the portable electronic device during camera functionality and to retract when not in use, wherein the first through third configurations of the portable electronic device correspond to relative positions of the camera.

2. The portable electronic device of claim 1, further comprising:
   a sensor operatively associated with the multi-mode matching circuit, wherein the sensor is configured to detect the first through third configurations of the housing of the portable electronic device and wherein the multi-mode matching circuit is configured to adjust at least one parameter of the multi-mode matching circuit responsive to the first, second and/or third detected configurations of the housing of the portable electronic device, and wherein the at least one parameter is stored in a lookup table; and
   a processor operatively associated with the sensor, the processor being configured to locate the at least one parameter in the lookup table using the first, second and/or third detected configuration of the housing of the portable electronic device as a pointer for an entry in the lookup table.

* * * * *